Feb. 14, 1956  K. SCHWENK  2,734,742
ELASTIC SUPPORT FOR REAR WHEELS OF VEHICLES
Filed March 7, 1951  2 Sheets-Sheet 1
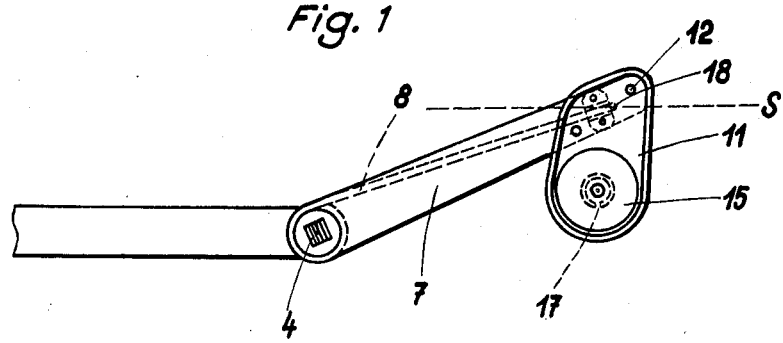
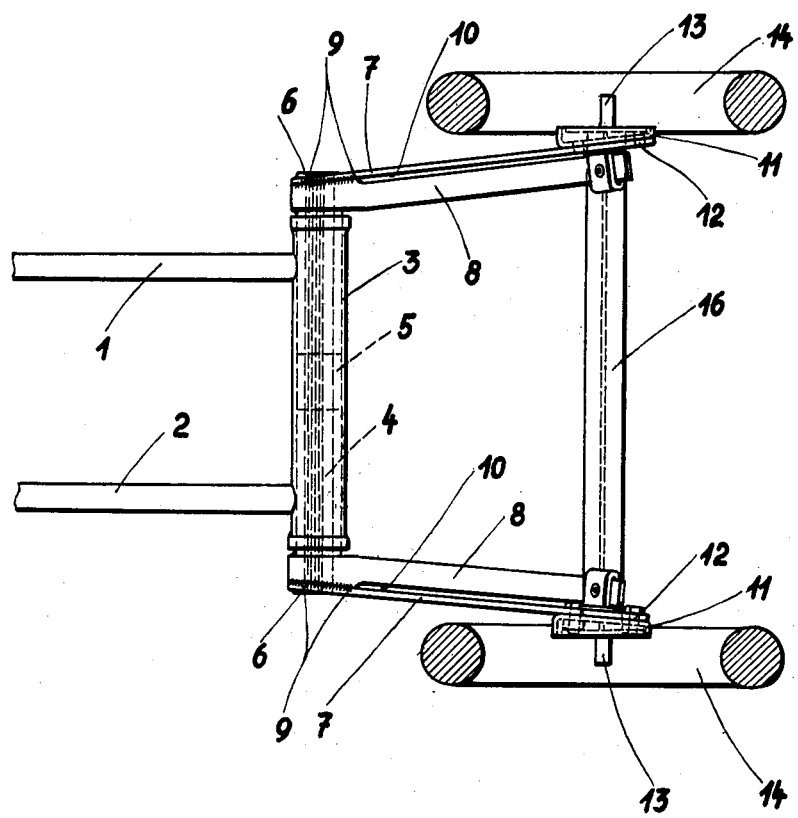
Inventor:
Kurt Schwenk
By Richards & Geier
ATTORNEYS Feb. 14, 1956    K. SCHWENK    2,734,742
ELASTIC SUPPORT FOR REAR WHEELS OF VEHICLES
Filed March 7, 1951    2 Sheets-Sheet 2

Inventor:
Kurt Schwenk
BY
Richard G. Geier
ATTORNEYS

United States Patent Office 2,734,742
Patented Feb. 14, 1956

2,734,742

ELASTIC SUPPORT FOR REAR WHEELS OF VEHICLES

Kurt Schwenk, Ingolstadt-Donau, Germany, assignor to Auto Union G. m. b. H., Ingolstadt, Germany, a company of Germany Application March 7, 1951, Serial No. 214,411

6 Claims. (Cl. 267—57)

This invention relates to a resilient support for the rear wheels of vehicles.

Heretofore, flat springs supporting rear wheels were arranged comparatively high above the rear axle so that a high support was necessary to carry such springs with the result that valuable space within the vehicle was consumed.

Heretofore, each wheel was caused to follow the ruts and depressions of the street with the result that on bad roads the entire vehicle was subject to vibrations. This made the vehicle particularly unstable on curves.

An object of this invention is the elimination of prior art spring supports or spring tunnels and the provision of a wheel support which is so constructed that a large amount of space for passengers, baggage, etc. is provided at the rear portion of the vehicle.

Another object is to construct a wheel support which will provide exceptionally good stability at curves for the vehicle.

Yet another object is to provide an elastic support by means of which the construction of the vehicle as a whole will be considerably improved as compared to prior art constructions.

Other objects of the present invention will become apparent in the course of the following specification.

In accomplishing the objects of the present invention, it was found desirable to provide an elastic support for rear wheels of vehicles wherein the axle stubs of the rear wheels are connected to the twistable bar springs of the vehicle frame or the vehicle body over crank arms which are so constructed that the ends of the crank arms connected to the axle stubs extend approximately to a horizontal plane passing through the center of gravity of the vehicle. This arrangement was found to improve to a remarkable extent the stability of the vehicle while passing curves without it being necessary to provide a high spring support.

Furthermore, in accordance with the present invention, each crank arm consists of two parts which are not connected one to the other throughout a large portion of their lengths. Due to this arrangement, one of the parts can serve to stabilize the vehicle while the other part is used to provide the resiliency.

In accordance with another feature of the invention, the stability of a vehicle at curves is found improved by the use of an axle or shaft which joins the axle stubs. Finally, the stability of curves is increased by constructing the axle or shaft so that it can be resiliently twisted. This can be attained by constructing the axle of an elongated tube having a longitudinal slot.

According to a preferred construction of the invention, the two parts of the crank arm consist of flat bars. Such bars are not only extremely light but they also have a very high resistance in the direction of their surfaces while they are resilient and can be twisted in the other direction, thereby avoiding breakage.

A further important feature of the invention is that one of these flat bars of the crank arms extends at right angles to the wheel axle and is rigidly connected with a shield-like support which carries the axle stub. The other flat bar extends, on the other hand, in the direction of the wheel axle and is elastically connected with the shield-like support. Due to this arrangement, the resilient work of the twistable bar springs is transmitted to the flat bar which is perpendicular to the wheel axle, while the twistable bar extending in the direction of the wheel axle is used to provide the sidewise stability of the rear axles and, consequently of the vehicle as a whole.

According to a special modification of the inventive idea, the two parts of the crank arm are spread outwardly and the free end of one of the parts is located above the axle stub, while the free end of the other part is located below the axle stub. This arrangement is particularly effective to absorb braking forces.

According to a further form of the inventive idea, the flat bars, constituting the crank arm, are located closely to each other, so that they form the letter T in cross-section and two of their adjacent ends are joined so that the bars form an acute angle. In this construction the two parts of the crank arm extend to the plane which passes through the center of gravity, so that the entire space of the wheel casing is utilized while the elastic axle extends below approximately on the same level as the frame of the vehicle.

Furthermore, in accordance with the present invention, there is provided an elastic connecting member, consisting preferably of rubber which extends between one of the members of the crank arm and the supporting element, said connecting member of rubber being capable of receiving pressure, pulling and shearing forces and being adapted to compensate the shortening of distances which take place when the axle is inclined.

The invention will appear more clearly from the following detailed description when taken in connection with the accompanying drawing, showing by way of example preferred embodiments of the inventive idea.

In the drawing:

Figure 1 is a side view of a support constructed in accordance with the principles of the present invention.

Figure 2 is a top view of the support of Figure 1.

Figure 3:
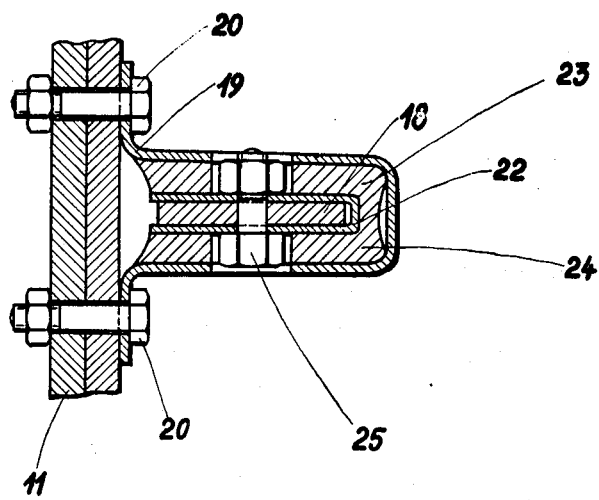
Figure 3 shows in section and on an enlarged scale the connection between a shield-like support and the crank arm.

Figures 1 and 2 of the drawings show a vehicle, the body or frame of which includes longitudinal carriers 1 and 2. A plurality of flat springs 4 are placed one next to the other to form an elongated member which is firmly held by an inner sleeve 5 within a tube 3. The tube 3 is firmly attached to the ends of the frame members 1 and 2. Guides 6 are rotatably mounted at the ends of the tube 3 and carry the ends of the elongated spring body 4. Each of the guide members 6 is firmly connected by soldering or otherwise with adjacent ends of the two crank arm elements 7 and 8. The crank arm elements 7 and 8 are joined to each other at 9 and then extend at a distance one from the other, being separated by an air gap 10. The arm elements or portions 7 and 8 consist of flat bars. The arm portion 7 is firmly connected by bolts 12 with a shield-like support 11. The support 11 carries an axle stub 13 which carries a rear wheel 14. Furthermore, the support 11 carries a plate 15, constituting the end of an axle 16. As shown in Fig. 2, there are two crank arms, each consisting of the portions 7 and 8 which extend between opposite ends of the tube 3. The tube 16 extends parallel to the tube 3 between the other ends of the two crank arms. As already stated, the tube 16 is firmly connected at its two ends with the plates 15. The tube 16 is hollow and is provided with an elongated slot 17.

The crank arm member 7 is firmly connected to the supporting shield 11 and its flat surfaces extend perpendicularly to the axle 16. Thus, the member 7 transmits essentially the resilient work of the springs 4. On the other hand, the member 8 has flat surfaces which extend in a plane parallel to the axle 16, so that this member is used to resist lateral movement. The end 18 of the member 8 lies approximately in a horizontal plane which extends through the center of gravity of the vehicle and which is indicated diagrammatically by the letter S in Figure 1.

As shown in Figure 3, the end 18 of the member 8 is connected with a cover 19 which may be made of metal and which is mounted upon the shield-like support 11 by means of bolts 20. The casing 19 has the form of a U-shaped rider containing an inner rider or cover 22 which is separated from the casing 21 by rubber inserts 23 and 24. These rubber inserts are firmly connected with the members 19 and 22. A bolt 25 connects the end 18 of the member 8 with the casing 19.

Figure 4:
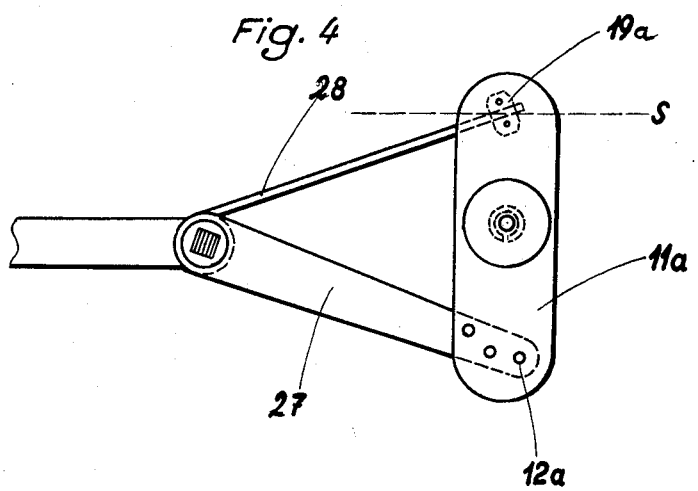
Figure 4 shows diagrammatically and in side view a somewhat differently constructed wheel support.

Figure 4 illustrates a somewhat different construction, wherein the crank arm consists of two members 27 and 28 which extend outwardly and form a substantial acute angle one with the other. Adjacent ends of the members 27 and 28 are connected with each other, while the opposite ends are attached to a shield-like support 11a. The outer end of the member 27 is connected to the lower portion of the shield 11a by means of members 12a which are indicated diagrammatically in Figure 4 and which may consist of bolts or rivets. On the other hand, the free end of the member 28 is elastically connected with the upper portion of the shield-like support 11a by means of an elastic connection 19a which may be substantially the same as the one shown in Figure 3.

It is apparent that the examples shown above have been given solely by way of illustration and not by way of limitation and that they are subject to many variations and modifications within the scope of the present invention. All such variations and modifications are to be included within the scope of the present invention.

What is claimed is:

1. A support for rear wheels of a vehicle, said support comprising, in combination with a vehicle frame, a spring carried by said frame and two axle stubs for the rear wheels, two crank arms, means pivotally connecting ends of said crank arms with said frame, each of said crank arms having two separate portions rigidly connected with each other adjacent the pivot of the crank arm, shield-like plates, and means connecting said plates with said axle stubs, the other ends of said crank arms being connected to said plates, one of said portions of the crank arm being connected to the plate substantially in the horizontal plane through the center of gravity of the vehicle, said one portion substantially resisting the transverse forces exerted upon the vehicle.

2. In a vehicle having a vehicle frame and two axle stubs for the rear wheels, a support for the rear wheels, said support comprising two crank arms, means pivotally connecting ends of said crank arms with said frame, each of said crank arms having an outer portion consisting of a flat bar extending in a vertical plane, and a separate inner portion consisting of a flat bar extending in a plane perpendicular to said outer portion, said portions extending substantially closely one to the other and forming a T in cross-section, said two portions being rigidly connected with each other adjacent the pivot of the crank arm, shield-like plates, means connecting said plates with said axle stubs, a slotted tubular axle extending in alignment with said axle stubs, means connecting said slotted tubular axle with said shield-like plates, and means separately connecting the other ends of the two portions of each crank arm to the plate.

3. A support for rear wheels of a vehicle, said support comprising, in combination with a vehicle frame, a spring carried by said frame and two axle stubs for the rear wheels, a tube interconnecting said axle stubs and having a longitudinal slot formed therein, two crank arms, means pivotally connecting ends of said crank arms with said frame, each of said crank arms having two separate portions rigidly connected with each other adjacent the pivot, shield-like plates, means connecting said plates with said axle stubs, one of said portions of each crank arm being rigidly connected with a separate plate and transmitting the spring forces exerted upon the vehicle, and elastic means connecting the other portion of each crank arm with the plate.

4. A support in accordance with claim 1, wherein the two separate portions of each crank arm consist of flat bars joined along a part of their lengths, said portions extending substantially closely one to the other and forming a T in cross-section.

5. A support in accordance with claim 1, wherein the two separate portions of each crank arm consist of flat bars extending substantially closely one to the other and joined close to their ends along a part of their lengths, said portions forming an acute angle.

6. A support in accordance with claim 1, wherein the two separate portions of each crank arm consist of diverging flat bars joined close to their adjacent ends along a part of their lengths, the diverging ends of said portions being connected to said plate above and below the axle stub.

References Cited in the file of this patent

UNITED STATES PATENTS

| | | |
|---|---|---|
| 252,825 | Wetmore | Jan. 24, 1882 |
| 2,069,911 | Bourdon | Feb. 9, 1937 |
| 2,083,085 | Palmer | June 8, 1937 |
| 2,226,047 | Borgward | Dec. 24, 1940 |
| 2,245,585 | Hickman | June 17, 1941 |
| 2,256,069 | Wagner | Sept. 16, 1941 |
| 2,350,353 | Heftler | June 6, 1944 |
| 2,480,934 | Julien | Sept. 6, 1949 |

FOREIGN PATENTS

| | | |
|---|---|---|
| 303,912 | Great Britain | Jan. 14, 1929 |
| 610,518 | Great Britain | Oct. 18, 1948 |
| 636,972 | Germany | Oct. 20, 1936 |